United States Patent [19]

Rabatin

[11] 4,088,894
[45] May 9, 1978

[54] (Ba,Sr)F, (Cl,Br) : $Eu^{+2}$ X-RAY IMAGE CONVERTERS UTILIZING LAOBR (TM,TB) PHOSPHORS

[75] Inventor: Jacob G. Rabatin, Chardon, Ohio

[73] Assignee: General Electric Company, Schenectady, N.Y.

[21] Appl. No.: 750,030

[22] Filed: Dec. 13, 1976

[51] Int. Cl.² .............................................. G01J 1/58
[52] U.S. Cl. ................................. 250/483; 250/486; 252/301.4 H
[58] Field of Search .......................... 250/483, 486; 252/301.4 H

[56] References Cited

U.S. PATENT DOCUMENTS

| 3,650,976 | 3/1972 | Luckey | 250/483 |
| 3,795,814 | 3/1974 | Rabatin | 252/301.4 H |
| 3,936,644 | 2/1976 | Rabatin | 250/486 |

Primary Examiner—Harold A. Dixon
Attorney, Agent, or Firm—John F. McDevitt; Lawrence R. Kempton; Frank L. Neuhauser

[57] ABSTRACT

The performance characteristics of (Ba,Sr)F, (Cl,Br) : $Eu^{+2}$ phosphors may be improved by combining these phosphors with particular rare earth oxyhalide phosphors. In the preferred embodiments, the latter phosphors have relatively small and well-formed crystalline particles which become interspersed with the larger crystalline particles of the (Ba,Sr)F, (Cl,Br) : $Eu^{+2}$ phosphor.

15 Claims, 1 Drawing Figure

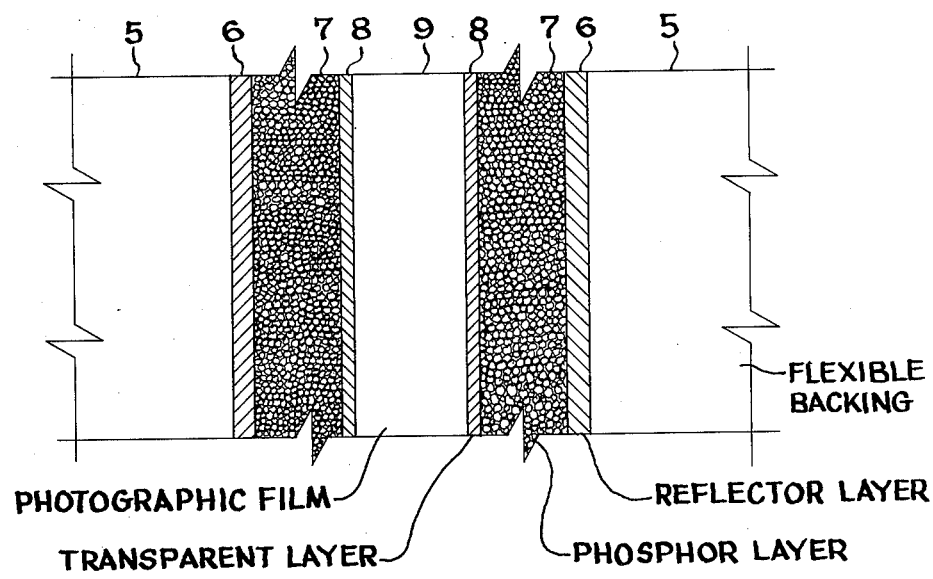

$(Ba,Sr)F, (Cl,Br) : Eu^{+2}$ X-RAY IMAGE CONVERTERS UTILIZING LAOBR (TM,TB) PHOSPHORS

CROSS-REFERENCE TO RELATED PATENTS

A multi-layer x-ray screen construction is described and claimed in U.S. Pat. No. 3,936,644 which issued Feb. 3, 1976, and is assigned to the assignee of the present invention. Said screen utilizes a phosphor composition adjacent the photographic film which is less bright than a phosphor composition disposed remotely with respect to the film.

FIELD OF THE INVENTION

The present invention relates to x-ray image converters and more particularly to such converters that utilize $(Ba,Sr)F, (Cl, Br):Eu^{+2}$ combined with an activated rare earth oxyhalide phosphor which results in image converters of improved performance characteristics.

BRIEF DESCRIPTION OF THE PRIOR ART

For x-ray image converter applications, especially when used in medical radiography, it becomes desirable to improve both speed and resolution of response while minimizing the quantum mottle for conversion of x-rays to visible light. Quantum mottle is a noise factor which contributes to the graininess of a converter image. Quantum mottle becomes a significant factor when the converted image has a relatively low visual signal to noise ratio. Calcium tungstate phosphors have been the conventional luminescent material used in such applications for a number of years. For example, this conventional fluorescent material has been employed in x-ray intensifying screens for use with photographic film. Typically, such films are placed between two intensifying screens in specially designed cassettes with the phosphor being capable of absorbing the x-rays in the region of interest for conversion to blue-near ultraviolet radiation where the photographic film is most sensitive. A faster screen is desirable to reduce the amount of x-ray exposure to the patient; and with such faster response, further minimizing the occurrence of a blurred image from physical movement by the patient. A more efficient conversion response by the phosphor which produces a visible image having greater resolution and lower quantum mottle at a given level of x-ray exposure is also desirable in medical radiography since it enhances the ability to visually detect an object in the image.

In an effort to increase the speed of phosphors as used in image converter devices, $(Ba,Sr)F, (Cl, Br):Eu^{+2}$ phosphors have been developed. One such phosphor is utilized in x-ray intensifier screen systems which are identified by the DuPont trademark QUANTA II. These screens contain coarse 6–30 micron particles and are rather thick; the back screen usually being 8.5 mils thick and the front screen being over 5 mils thick. The performance of these screens is shown in Table I and is compared to the conventional calcium tungstate phosphor material, which is also available from DuPont and is identified by the trademark PAR. The comparison in the table was made at 80 KV, at one inch of AL filtration.

TABLE I

| Phosphor in Screen | Relative Speed | Resolution 60 KVp, Line Pairs/mm | Quantum Mottle |
|---|---|---|---|
| $CaWO_4$ | 1.0 | 7.6 | good |
| $Ba_{.88}Sr_{.066}Eu_{.054}F,Cl$ | 5.6 | 5.4 | very grainy |

From a review of the above table, it will be clear that the $(Ba,Sr)F, (Cl, Br):Eu^{+2}$ phosphor does have a higher relative speed than the calcium tungstate phosphor but suffers from lower resolution and higher quantum mottle.

SUMMARY OF THE PRESENT INVENTION

The present invention is directed to improving the performance characteristics of $(Ba,Sr)F, (Cl, Br):Eu^{+2}$ phosphors by combination with certain rare earth oxyhalide phosphors and more particularly improving the resolution and quantum mottle characteristics thereof. In the preferred embodiments, it has been found that this conventional phosphor may be improved by adding smaller sized particles of certain activated rare earth oxyhalide phosphors so that a "window effect" occurs between the larger $(Ba,Sr)F, (Cl, Br):Eu^{+2}$ particles which permits better escape of light through the smaller particles. One aspect of such improvement is reduced quantum mottle which occurs because the fluorescing $K\alpha$ x-ray of rare earth elements such as La and Gd are better absorbed by Ba. The presence of the smaller particles, which are physically admixed with the larger phosphor particles also improves resolution.

In a different embodiment having the x-ray screen configuration disclosed in the aforementioned U.S. Pat. No 3,936,644, a layer of the $(Ba,Sr)F, (Cl, Br):Eu^{+2}$ phosphor is disposed adjacent the photographic film and a layer of the selected rare earth oxyhalide phosphor overlies the first phosphor layer so as to be disposed in a more remote location with respect to the film. Such an arrangement makes possible more image spreading than occurs when the phosphors are admixed, but this undesirable effect is expected to be offset by the particular multi-layer screen construction being employed so as to provide the desired improvements. Accordingly, the present invention in its most general form utilizes a rare earth oxyhalide phosphor having the general formula:

wherein
Ln is one or more of La and Gd;
X is one or more of Cl and Br; and
Ty is one or more of Tm and Tb and is present as an activator in combination with a phosphor having the general formula:

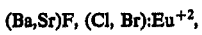

wherein said phosphor combination provides improved conversion of x-rays to visible light with higher resolution and lower quantum mottle.

BRIEF DESCRIPTION OF THE DRAWING

The above-mentioned objects and advantages of the present invention will be more clearly understood when considered in conjunction with the accompanying drawing.

The FIGURE is a schematic drawing showing a section a preferred image converter utilizing the admixture phosphor combination of the present invention.

DESCRIPTION OF THE PREFERRED EMBODIMENTS

The preferred embodiments comprise x-ray image converter devices utilizing well-formed crystals of a phosphor material having the general formula:

LnOX:Ty admixed with (Ba,Sr)F, (Cl, Br):Eu$^{+2}$ wherein
Ln is one or more of La and Gd;
X is one or more of Cl and Br;
Ty is one or more of Tm, Tb and is present as an activator; and
Eu is also present as an activator.

Tests were made between the larger particle phosphor, the smaller particle phosphor and a physical admixture of the two. Tests were conducted for actual x-ray intensifier screens using standard Elvacite binder systems. The results are shown in Table II. In all cases the screens were 4.0 mils thick.

TABLE II

| Screen Composition | Relative Speeds | Resolution Line Pairs/mm | Quantum Mottle |
|---|---|---|---|
| Ba$_{.88}$Sr$_{.066}$Eu$_{.054}$F,Cl | 2.2 | 5.4 | poorest |
| ½ vol of above, ½ vol of below | 4.0 | 6.2 | intermediate |
| LaOBr .003 Tm | 5.0 | 7.0 | best |

From a consideration of Table II, it will be observed that the admixture provides speed, resolution and quantum mottle characteristics that are intermediate those of the unmixed end member phosphors. Other tests demonstrate that a greater volume contribution of the rare earth oxyhalide-activated phosphor will further improve the speed, resolution and quantum mottle characteristics of an admixture. However, the improvement is not linearly proportional to the contribution of the rare earth xyhalide-activated phosphor.

An example of the preparation of one of the end member phosphors, namely Ba$_{.88}$Sr$_{.066}$Eu$_{.054}$F,Cl, is as follows:

357 gm of BaF$_2$, 299 gm of BaCO$_3$, 39 gm of SrCO$_3$, 38.0 gm of Eu$_2$O$_3$ and 276 gm of NH$_4$Cl are blended and then fired for 1 hour at 400° C in covered containers.

To the fired mixture are added 50 gm of KCl and the new mixture is fired for 2 hours at 750° C in a reducing atmosphere of 5% H$_2$ and 95% N$_2$.

The resulting mass is washed free of KCl, filtered, dried and pulverized. After sifting through 400 mesh the material is ready for use in x-ray screens.

This phosphor in terms of individual concentration components may be represented by:

Ba$_{1-A-B}$Sr$_A$Eu$_B$FX wherein
A is from about 0.0 to about 0.5 mole;
B is from about 0.005 to about 0.1 mole; and
X is one or more of Cl and Br.

The rare earth oxyhalide-activated phosphor portion of the admixture has the general formula:

LnOX:Ty wherein
Ln is one or more of La and Gd;
X is one or more of Cl and Br; and
Ty is one or more of Tm, Tb and is present as an activator.

The preparation of rare earth oxyhalides of this type are disclosed in U.S. Pat. No. 3,591,516. The inclusion of thulium as an activator for this type of phosphor is disclosed in U.S. Pat. No. 3,795,814. The disclosure of terbium as an activator for this type of phosphor is disclosed in reissued U.S. Pat. Re No. 28,592.

The utilization of a coactivated rare earth oxyhalide, including both Tm and Tb is disclosed in my copending U.S. patent application entitled "Rare Earth Oxyhalide Phosphors Coactivated with Terbium/Thulium," Ser. No. 750,200, and filed concurrently with the present application.

The admixed phosphor serves as an excellent x-ray image converter in a number of applications including x-ray image intensifier tubes, in fluoroscopic screens and in radiographic intensifier screens. In order to illustrate utilization of the present invention, the structure of one type of an x-ray image converter will be discussed in connection with the figure.

The figure shows an arrangement consisting of a double emulsion photographic film 9 which is sandwiched between two x-ray intensifying screens. The screens are constructed of a flexible backing 5, a reflector layer 6, a phosphor layer 7 to which this invention relates and a transparent top layer 8.

It will be apparent from the foregoing description that novel phosphor combinations have been disclosed for x-ray image converter devices which exhibit particular advantages when employed in radiographic screens having various constructions. It should also be appreciated from the foregoing description that the activated rare earth oxyhalide phosphor constituent of the phosphor combination can be prepared having slightly modified compositions than above specifically disclosed without sacrificing the disclosed performance advantages. For example, a minor substitution of fluoride ion for chloride or bromide ion in the activated oxyhalide phosphor constituent should not materially lower these advantages. It is intended to limit the present invention, therefore, only by the scope of the following claims.

What I claim as new and desire to secure by Letters Patent of the United States is:

1. A physical admixture of phosphors including: a first phosphor, of well-formed relatively small particles, according to the formula:

LnOX:Ty wherein
Ln is one or more of La and Gd;
X is one or more of Cl and Br;
Ty is one or more of Tm, Tb and is present as an activator;

with a second phosphor, of relatively large particles, according to the formula:

Ba$_{1-A-B}$Sr$_A$Eu$_B$FX wherein
A is from about .0 to about 0.5 mole;
B is from about .005 to about 0.1 mole; and
X is one or more of Cl and Br, the admixture resulting in improved conversion of x-rays to visible light with higher resolution and lower quantum mottle.

2. An image converter including the admixed phosphors of claim 1 supported on a backing member, said phosphors being capable of converting x-radiation to longer wavelength.

3. An image converter as set forth in claim 2 adapted for intensifying the exposure of photographic film to x-radiation.

4. The subject matter set forth in claim 2 wherein said first phosphor is lanthanum oxybromide coactivated with thulium and terbium.

5. An image converter set forth in claim 2 wherein said first phosphor is lanthanum oxychloride coactivated with thulium and terbium.

6. An image converter set forth in claim 2 wherein said first phosphor is gadolinium oxychloride coactivated with thulium and terbium.

7. An image converter set forth in claim 2 wherein said first phosphor is gadolinium oxybromide coactivated with thulium and terbium.

8. An image converter set forth in claim 2 wherein said first phosphor is lanthanum oxybromide activated with thulium.

9. An image converter set forth in claim 2 wherein said first phosphor is lanthanum oxybromide activated with terbium.

10. An image converter set forth in claim 2 wherein said first phosphor is lanthanum oxychloride activated with thulium.

11. An image converter set forth in claim 2 wherein said first phosphor is lanthanum oxychloride activated with terbium.

12. An image converter set forth in claim 2 wherein said first phosphor is gadolinium oxybromide activated with thulium.

13. An image converter set forth in claim 2 wherein said first phosphor is gadolinium oxybromide activated with terbium.

14. An image converter set forth in claim 2 wherein said first phosphor is gadolinium oxychloride activated with thulium.

15. An image converter set forth in claim 2 wherein said first phosphor is gadolinium oxychloride activated with terbium.

* * * * *